(12) United States Patent
Yokoyama et al.

(10) Patent No.: US 7,654,560 B2
(45) Date of Patent: Feb. 2, 2010

(54) AIR BAG FOR VEHICLE

(75) Inventors: Aki Yokoyama, Fujinomiya (JP);
Junichi Umehara, Fuji-gun (JP);
Katsuaki Iwaki, Fuji (JP); Yasunori Nagasawa, Fuji (JP)

(73) Assignee: Nihon Plast Co., Ltd., Fuji-Shi, Shizuoka-Ken (JP)

( * ) Notice: Subject to any disclaimer, the term of this patent is extended or adjusted under 35 U.S.C. 154(b) by 200 days.

(21) Appl. No.: 11/657,484

(22) Filed: Jan. 25, 2007

(65) Prior Publication Data
US 2007/0170706 A1 Jul. 26, 2007

(30) Foreign Application Priority Data
Jan. 26, 2006 (JP) ............................. 2006-017951

(51) Int. Cl.
*B60R 21/16* (2006.01)
(52) U.S. Cl. .................. 280/729; 280/730.2; 280/743.1
(58) Field of Classification Search .............. 280/730.2, 280/729, 743.1
See application file for complete search history.

(56) References Cited

U.S. PATENT DOCUMENTS 3,598,159 A * 8/1971 MacIntyre .............. 139/384 R
5,464,250 A * 11/1995 Sato ......................... 280/743.1
5,865,465 A * 2/1999 Bauer et al. .............. 280/743.1
7,025,375 B2 * 4/2006 Drossler et al. ............. 280/729

FOREIGN PATENT DOCUMENTS

JP 2004-268880 9/2004

* cited by examiner

*Primary Examiner*—Eric Culbreth
(74) *Attorney, Agent, or Firm*—NDQ & M Watchstone LLP

(57) ABSTRACT

An air bag 1 is provided. At a vehicle side impact, the air bag 1 unfolds from an upper part of a vehicle body downwardly. The air bag 1 includes an airbag body 10 having an inside foundation cloth 8a and an outside foundation cloth 8b, and a pair of inner-cloths 19a, 19b arranged in the airbag body 10. The inside inner-cloth 19a is joined to the outside inner-cloth 19b through two inner junctions 21, 21 separated from each other in a fore-and-aft direction of the vehicle. The inner-cloths 19a, 19b have front ends, rear ends and intermediate portions between the inner junctions 21, 21, all of which are joined to the foundation cloths 8a, 8b through overlapping junctions 22a, 22b. In arrangement, the overlapping junctions 22a of the inside inner-cloth 19a are shifted from the overlapping junctions 22b of the outside inner-cloth 19b forwardly. Consequently, triple-layer tubular expansion chambers 25a, 26, 25b are defined in the airbag body 10, allowing a passenger's head to be received certainly.

7 Claims, 7 Drawing Sheets

AIR BAG FOR VEHICLE

BACKGROUND OF THE INVENTION

1. Field of the Invention

The present invention relates to an air bag for a vehicle. More particularly, the present invention relates to an air bag for absorbing a lateral impact applied on a passenger (or passengers) in a vehicle.

2. Description of the Related Art

In the related art, Japanese Patent Application Laid-open No. 2004-268880 discloses an air bag constructed so as to soften a side impact applied on a passenger (passengers) when a vehicle is subjected to a lateral impact. In accommodation, the above air bag is rolled up (folded like a roll) and accommodated in each of side-roof rails. The side-roof rails are positioned on both sides of an upper part of a vehicle body. The air bag is connected to an inflator. When a vehicle has a lateral impact (side collision), the air bag is instantly supplied with gas from the inflator for expansion. Then, the air bag unfolds its expanded body downwardly and enters between a vehicle's side component (e.g. side glass, door, etc.) and a passenger, like a curtain. Owing to this interposition of such a swollen curtain, the air bag serves to absorb an external force from vehicle's sideways to some degree and soften a side impact applied on the passenger in the vehicle, in particular, a passenger's head.

The air bag includes an airbag body like an airtight pouch. The airbag body consists of two sheets of foundation cloths: one in its unfolded state is positioned on the side of a side glass, while the other cloth in the unfolded state is positioned on the side of a passenger. For distinction, the former foundation cloth will be referred to as "outside foundation cloth" hereinafter, while the latter cloth will be referred to as "inside foundation cloth" hereinafter. In production, the periphery (rim) of the outside foundation cloth is joined to the periphery of the inside foundation cloth. In the resulting airbag body, its interior space is divided into a plurality of tubular expansion chambers through a plurality of junctions running up and down in the interior space. Each junction is provided by joining a part of the outside foundation cloth to a part of the inside foundation cloth. In this way, on each side of both foundation cloths, a plurality of tubular expansion chambers are lined up along a fore-and-aft direction of vehicle.

In other words, the airbag body has the tubular expansion chambers arranged in double file along the fore-and-aft direction of vehicle. Here, it should be noted that these tubular expansion chambers are not juxtaposed in the direction of a width of the air bag (referred to as "width direction of airbag" hereinafter) but the uniserial (single file) tubular expansion chambers on the side of the outside foundation cloth are shifted from the uniserial tubular expansion chambers on the side of the inside foundation cloth by half chamber, which seems to be a kind of "alternate" arrangement. That is, in lateral view, respective boundaries among the tubular expansion chambers on the side of the outside foundation cloth do not overlap those on the side of the inside foundation cloth. Such an alternate arrangement of the expansion chambers comes from a consideration that the air bag is preferably formed so as to enable at least one tubular expansion chamber to certainly receive a passenger's head within an entire length of the air bag in the fore-and-aft direction of vehicle.

In view of alleviating a side impact applied on a passenger's head more effectively, however, it is desirable that the air bag is constructed so that two or more tubular expansion chambers may receive a passenger's head on condition that these tubular expansion chambers are piled on each other in the width direction of air bag. In fact, such an improvement is desired in the conventional air bag mentioned above.

SUMMARY OF THE INVENTION

The present invention has been achieved with such points in mind.

It therefore is an object of the present invention to provide an air bag for vehicle that enables two or more tubular expansion chambers to receive a passenger's head on condition that the tubular chambers are piled on each other in the width direction of airbag when a vehicle has a lateral impact.

To achieve the object, according to a first aspect of the present invention, there is provided an air bag to be folded in a vertical direction of a vehicle and accommodated in an upper part of a vehicle body so as to unfold from the upper part downwardly at a vehicle impact, the air bag comprising, in its unfolded condition: an airbag body including an outside foundation cloth close to an exterior of the vehicle and an inside foundation cloth close to an interior of the vehicle, the outside and inside foundation cloths having respective peripheries joined to each other through a peripheral junction thereby forming a pouched body; and a pair of interior foundation cloths arranged in the airbag body and consisting of an outside inner-cloth positioned close to the outside foundation cloth and an inside inner-cloth positioned close to the inside foundation cloth, the outside inner-cloth being intermittently joined to the inside inner-cloth through at least two inner junctions separated from each other in a fore-and-aft direction of the vehicle to extend up and down with respect to the fore-and-aft direction of the vehicle, wherein the outside inner-cloth has a front end thereof, its rear end and its intermediate portion between the inner junctions, all of the ends and the intermediate portion are joined to the outside foundation cloth through overlapping junctions extending up and down with respect to the fore-and-aft direction of the vehicle, the inside inner-cloth has a front end thereof, its rear end and its intermediate portion between the inner junctions, all of the ends and the intermediate portion are joined to the inside foundation cloth through overlapping junctions extending up and down with respect to the fore-and-aft direction of the vehicle, and the overlapping junctions of the outside inner-cloth are shifted from the overlapping junctions of the inside inner-cloth on either forward or rearward in the fore-and-aft direction of the vehicle, whereby a plurality of tubular expansion chambers are defined in the airbag body to extend up and down with respect to the fore-and-aft direction of the vehicle.

According to a second aspect of the present invention, as it depends from the first aspect, there is provided the air bag wherein the overlapping junctions of the outside inner-cloth and the overlapping junctions of the inside inner-cloth are arranged so as to extent up and down slantwise to the vertical direction.

According to a third aspect of the present invention, as it depends from the first and the second aspect, there is provided the air bag wherein the inner junctions are arranged so as to extent up and down slantwise to the vertical direction.

According to a fourth aspect of the present invention, as it depends from one aspect among the first to the third aspect, there is provided the air bag wherein each of the inner junctions is provided by sewing a part of the outside inner-cloth with a part of the inside inner cloth.

According to a fifth aspect of the present invention, as it depends from one aspect among the first to the fourth aspect, there is provided the air bag wherein the overlapping junctions of the outside inner-cloth and the overlapping junctions of the inside inner-cloth are separated from each other at a predetermined distance in the fore-and-aft direction of the vehicle so as not to overlap each other through the uppermost end thereof or through the uppermost and lowermost ends thereof.

According to a sixth aspect of the present invention, as it depends from the first aspect, there is provided the air bag further comprising: an inflator connected to the airbag body to supply with gas at the vehicle impact, wherein the airbag body includes a front expansion part for a passenger seated on a front seat of the vehicle, a rear expansion part for another passenger seated on a rear seat of the vehicle and an intermediate communication path arranged between the front expansion part and the rear expansion part to communicate the front expansion part with the rear expansion part; and the interior foundation cloths are arranged in the front expansion part, while the inflator is connected to a rear end of the rear expansion part.

According to a seventh aspect of the present invention, there is provided an air bag to be folded in a vertical direction of a vehicle and accommodated in an upper part of a vehicle body so as to unfold from the upper part downwardly when developed by impact, the air bag comprising, in its unfolded condition: an airbag body including an outside foundation cloth facing to an interior wall of the vehicle and an inside foundation cloth located in a space end of an interior of the vehicle, the outside and inside foundation cloths having respective peripheries joined to each other through a peripheral junction thereby forming a pouched body; and an inner-cloth arranged in the airbag body, the inner-cloth joined to at least one of the outside and inside foundation cloths through at least two overlapping junctions slanted with respect to the direction where the air bag is downwardly developed in a manner such that the overlapping junctions are separated from each other at a predetermined distance in the fore-and-aft direction of the vehicle, thereby the overlapping junctions do not overlap each other when rolling up the air bag with one roll and two rolls.

According to an eighth aspect of the present invention, there is provided an air bag elongated in a longitudinal direction of a vehicle and accommodated in a vehicle body of the vehicle in folded state in the short sides direction of the air bag so as to unfold toward a lateral face of the vehicle when developed by impact, the air bag comprising, in its unfolded condition: an airbag body including an outside foundation cloth facing to an interior wall of the vehicle and an inside foundation cloth located in a space end of an interior of the vehicle, the outside and inside foundation cloths having respective peripheries joined to each other through a peripheral junction thereby forming a pouched body; and an inner-cloth arranged in the airbag body, the inner-cloth joined to at least one of the outside and inside foundation cloths through at least two overlapping junctions slanted with respect to the direction intersecting the short sides direction of the air bag in a manner such that the overlapping junctions are separated from each other at a predetermined distance in the fore-and-aft direction of the vehicle, thereby the overlapping junctions do not overlap each other when rolling up the air bag with one roll and two rolls.

Consequently, within the compass of the interior foundation cloths, triple-layer tubular expansion chambers are defined in the airbag body by the outside and inside foundation cloths and the inner-cloth(s) between the outside and inside foundation cloths. Further, as the tubular expansion chambers on the side of the outside foundation cloth and those on the side of the inside foundation cloth are shifted from each other in the fore-and-aft direction of the vehicle, two or more tubular expansion chambers can be assured in a section in the width direction of the air bag, allowing a passenger's head to be received certainly.

In addition, since the overlapping junctions of the outside inner-cloth and the overlapping junctions of the inside inner-cloth are arranged so as to extent up and down slantwise to the vertical direction, even when rolling up the air bag from its lowermost end, the overlapping junctions do not overlap each other since the overlapping junctions of the inside foundation cloth and the overlapping junctions of the outside foundation cloth extend up and down obliquely. Therefore, in the air bag in the folded state, its width can be reduced thereby facilitating an accommodation of the air bag into the upper part of the vehicle body.

Furthermore, since the overlapping junctions of the foundation cloths are arranged with regular intervals in the fore-and-aft direction so as not to overlap each other through the uppermost and lowermost ends thereof in the fore-and-aft direction of the vehicle, even when rolling up the air bag like a roll, the overlapping junctions, namely, the so-folded overlapping junctions do not overlap each other, thereby it is possible to reduce the width of the air bag in the folded state.

These and other objects and features of the present invention will become more fully apparent from the following description and appended claims taken in conjunction with the accompany drawings.

BRIEF DESCRIPTION OF THE ACCOMPANYING DRAWINGS

DETAILED DESCRIPTION OF THE PREFERRED EMBODIMENTS

Referring to accompanying drawings, one embodiment of the present invention will be described below, in detail.

Figure 1:
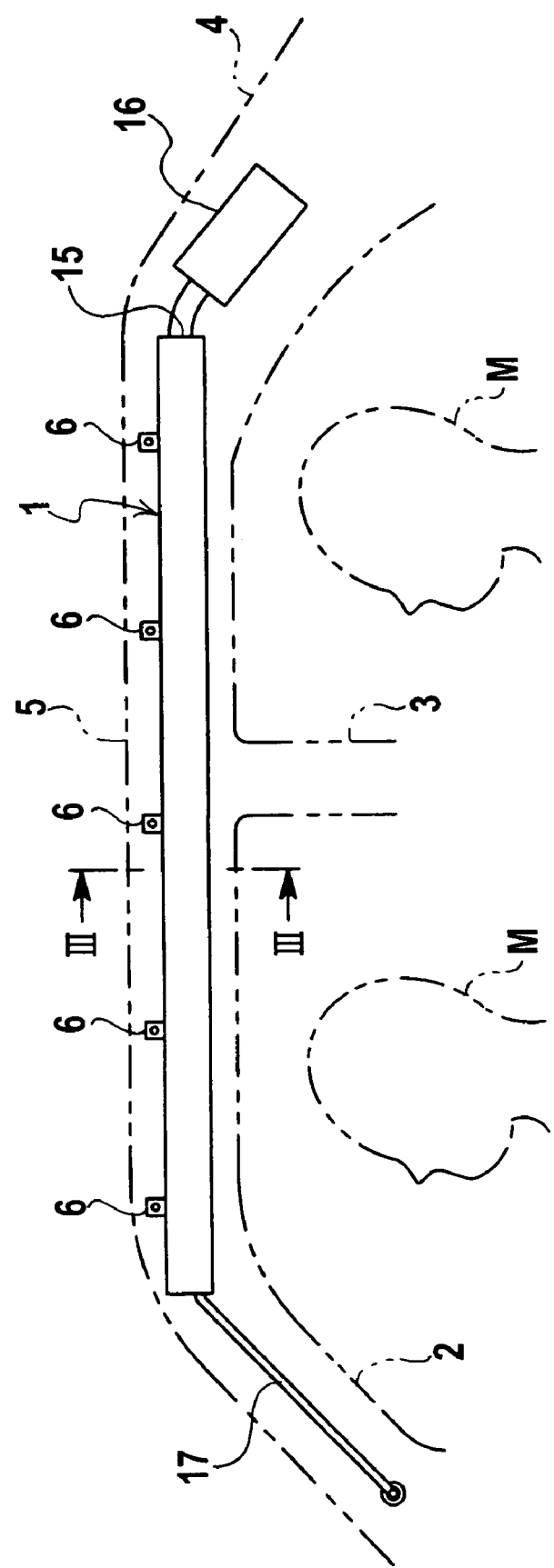
FIG. 1 is a side view of an air bag in accordance with one embodiment of the present invention, viewed from the interior side of a vehicle body and also showing a condition where the air bag is folded and accommodated in an upper part of the vehicle body.
Figure 2:
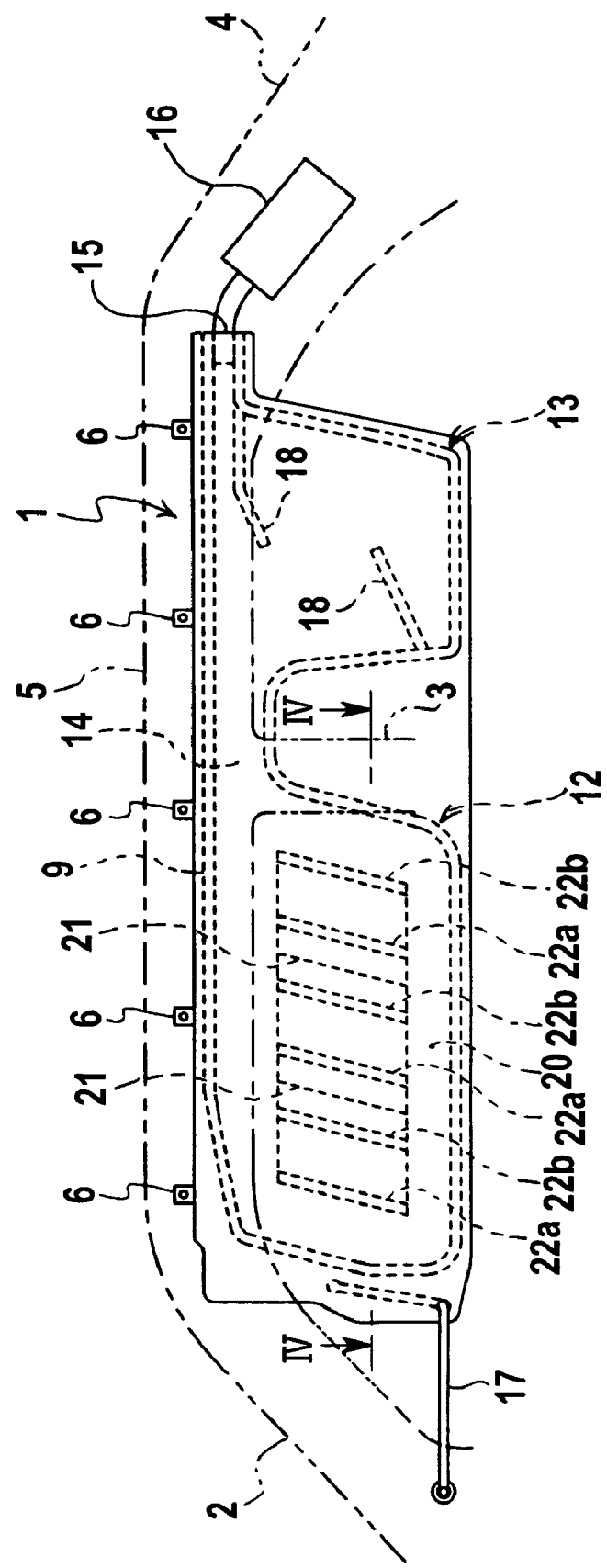
FIG. 2 is a side view similar to FIG. 1, showing a condition where the air bag is unfolded downwardly, like a curtain.

FIGS. 1 to 11 are views showing the embodiment of the present invention. FIG. 1 is a view of an upper part of an automobile, viewed from the interior of a vehicle cabin, showing a condition where an air bag 1 is folded and accommodated in the upper part of a vehicle body. FIG. 2 shows a condition where the air bag 1 is downwardly unfolded like a curtain when developed by impact.

Figure 3:
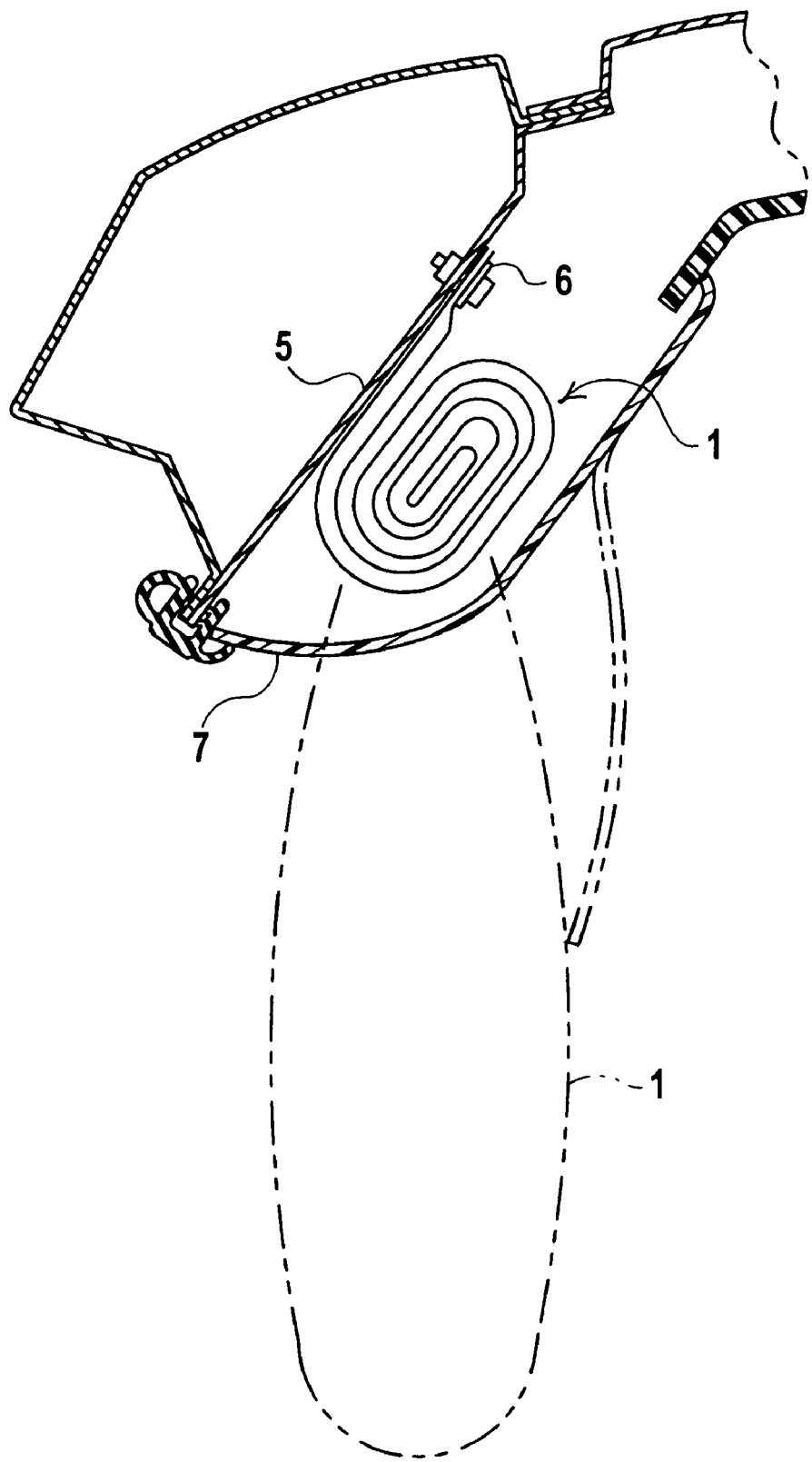
FIG. 3 is a sectional view taken along a line III-III of FIG. 1.

In FIGS. 1 and 2, reference numeral 2 designates a front pillar, 3 a center pillar, and reference numeral 4 designates a rear pillar. Formed on respective upper parts of the front pillar 2, the center pillar 3 and the rear pillar 4 is a side-roof rail 5 which has a closed cross section extending along a fore-and-aft direction of the automobile. Throughout the front pillar 2 and the rear pillar 4, an upper end of the air bag 1 is secured to the side-roof rail 5 through brackets 6. On the whole, the air bag 1 is rolled up through its lower end in a vertical direction of the automobile and accommodated in the upper part of the vehicle body. Such a folded condition is maintained since a not-shown wrap envelops the air bag 1. On the interior side of the vehicle cabin, as shown in FIG. 3, the folded air bag 1 is covered by a roof-side garnish 7.

The air bag 1 comprises an airbag body 10 in the form of a pouched body. The airbag body 10 is provided by overlapping an inside foundation cloth 8a and an outside foundation cloth 8b on each other and further joining respective peripheries of the cloths 8a, 8b to each other through a peripheral junction 9. The peripheral junction 9 exhibits high airtightness due to an adhesive 11. By the peripheral junction 9, the inner space of the airbag body 10 is classified to a front expansion part 12 corresponding to a passenger M seated on a front seat and a rear expansion part 13 corresponding to another passenger M seated on a rear seat. The front expansion part 12 is communicated with the rear expansion part 13 through an upper communication path 14. The upper communication part 14 is formed, at its rear end, with a connection port 15 to which an inflator 16 is connected.

A strap 17 is arranged between a front end of the airbag body 10 and the front pillar 2. In the rear expansion part 13, a joint line 18 of adhesive is formed to compartmentalize the inner space of the part 13.

In the front expansion part 12 of the airbag body 10, two sheets of interior foundation cloths 19a, 19b are arranged while leaving a lower communication path 20 in a lower part of the part 12. The interior foundation cloth 19a is positioned close to the inside foundation cloth 8a, while the other interior foundation cloth 19b is positioned close to the outside foundation cloth 8b. Therefore, the former interior foundation cloth 19a will be referred to as "inside inner-cloth 19a", hereinafter. Similarly, the latter interior foundation cloth 19b will be referred to as "outside inner-cloth 19b", hereinafter.

As for the inner-cloths 19a, 19b, their portions except respective front ends and rear ends are intermittently joined to each other by sewn inner junctions 21, 21 at a predetermined distance in the fore-and-aft direction of the vehicle.

In the airbag body 10, the inner junctions 21, 21 are defined so as to extend up and down (not perpendicular) with respect to the fore-and-aft direction of the vehicle. In detail, each of the inner junctions 21 extends up and down slantwise to perpendicularity by a predetermined angle θ (see FIG. 9). Thus, the inside inner-cloth 19a close to the inside foundation cloth 8a differs from the outside inner-cloth 19b close to the outside foundation cloth 8b in terms of their joint positions (see FIG. 4).

Figure 9:
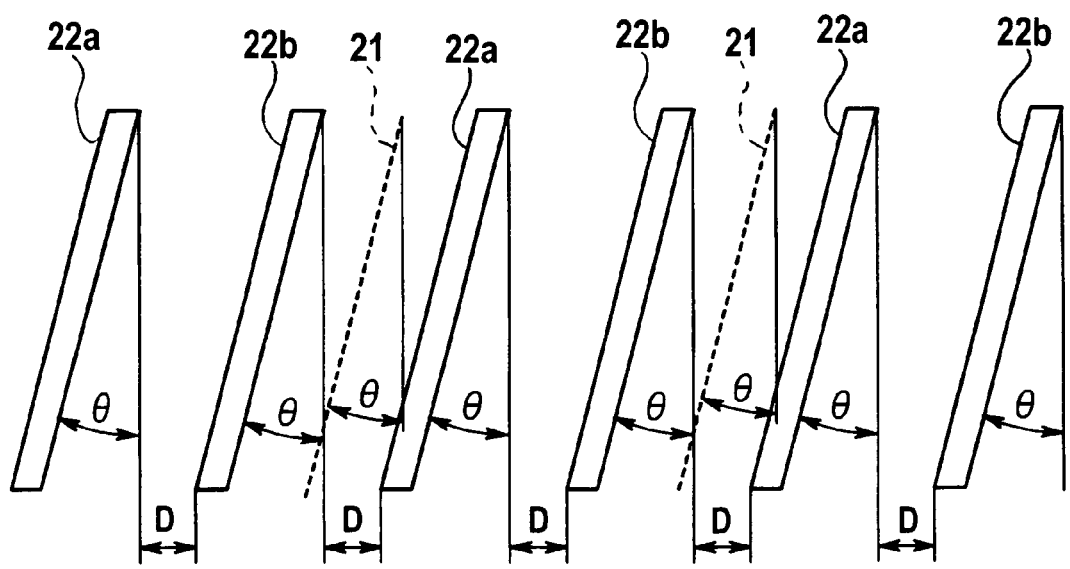
FIG. 9 is a view explaining the arrangement of overlapping junctions and inner junctions shown in FIG. 8.

As to the inside inner-cloth 19a, both front and rear ends and an intermediate portion between the inner junctions 21 are joined to the corresponding inside foundation cloth 8a by overlapping junctions 22a due to adhesives 11 extending up and down. As to the outside inner-cloth 19b, similarly, both front and rear ends and an intermediate portion between the inner junctions 21 are joined to the corresponding outside foundation cloth 8b by overlapping junctions 22b due to the adhesives 11 extending up and down. As shown in FIG. 9, each of the overlapping junctions 22a, 22b is also arranged to extend up and down slantwise to perpendicularity by a predetermined angle θ.

Figure 10:
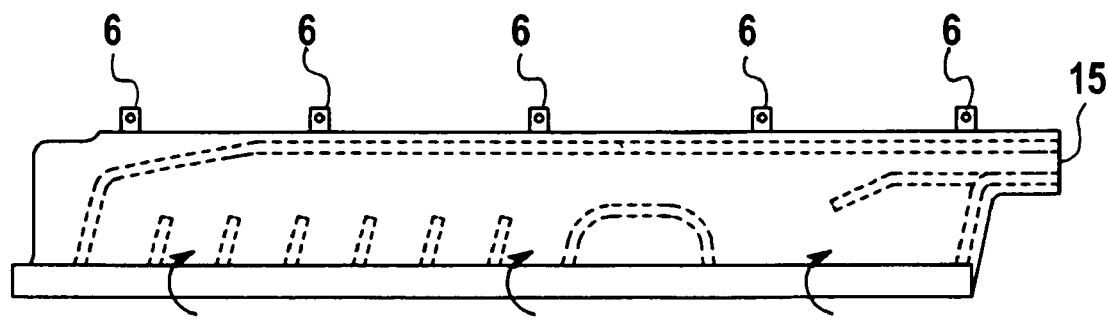
FIG. 10 is a side view showing a condition where the air bag of FIG. 8 is rolled up.
Figure 11:
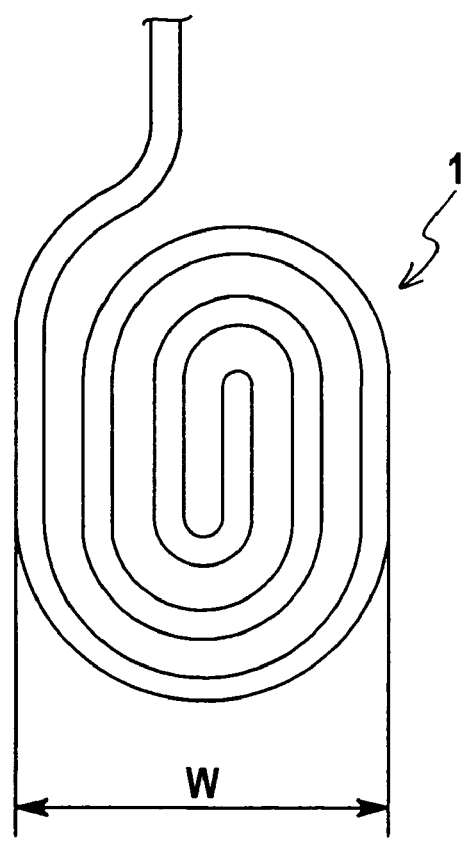
FIG. 11 is a sectional view of the air bag of FIG. 10 being rolled up.

As shown in FIG. 10, even when rolling up the air bag 1 from its lowermost end, the overlapping junctions 22a, 22b per se do not overlap each other since the overlapping junctions 22a of the inside foundation cloth 8a and the overlapping junctions 22b of the outside foundation cloth 8b extend up and down obliquely. In the air bag 1 in the folded state, its width W (see FIG. 11) can be reduced to facilitate an accommodation of the air bag 1 into the upper part of the vehicle body.

It should be noted that each overlapping junction 22a of the inside foundation cloth 8a is deviated from each overlapping junction 22b of the outside foundation cloth 8b forwardly. Additionally, each overlapping junction 22a of the inside foundation cloth 8a and each adjoining overlapping junction 22b of the outside foundation cloth 8b keep away from each other by a predetermined interval D so that they do not overlap each other up and down in a lateral view of the air bag (see FIG. 9).

In this way, owing to the arrangement of the overlapping junctions 22a, 22b of the foundation cloths 8a, 8b at regular intervals D in the fore-and-aft direction so as not to overlap each other through the uppermost and lowermost ends thereof in the fore-and-aft direction of the vehicle, when rolling up the air bag 1 like a roll, there overlapping junctions 22a, 22b, the so-folded overlapping junctions 22a, 22b per se do not overlap each other, whereby it is possible to reduce the width W of the air bag 1 in the folded state furthermore.

The above-constructed air bag 1 operates as follows.

When the vehicle collides with an object through a side body part, in other words, the vehicle is subjected to a side impact from the object, the air bag 1 is swollen by means of gas of the inflator 16. Then, as shown in FIG. 3, the air bag 1 pushes to open the roof-side garnish 7 downwardly and expands like a curtain downwardly.

Figure 4:
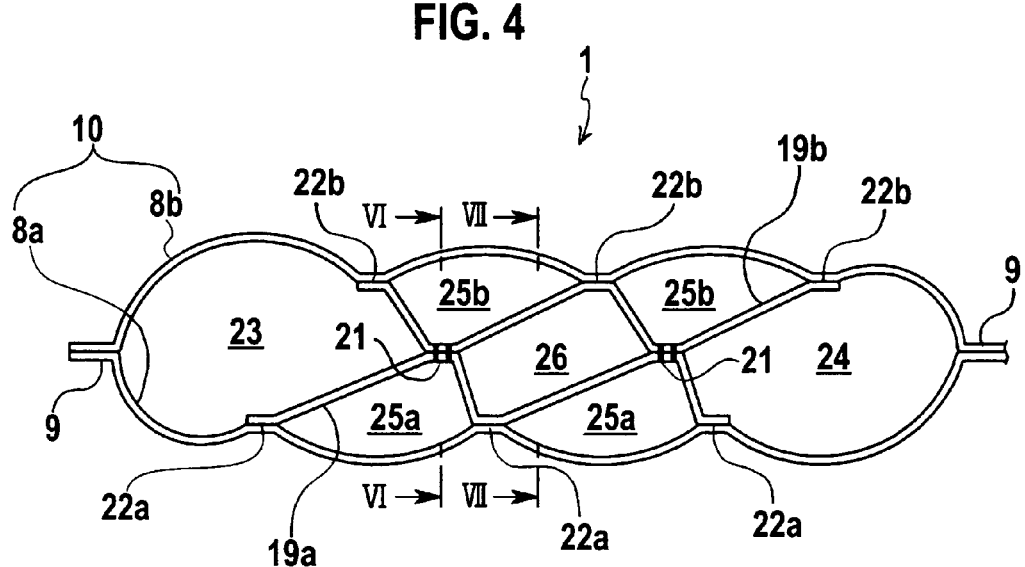
FIG. 4 is a sectional view taken along a line IV-IV of FIG. 2.
Figure 5:
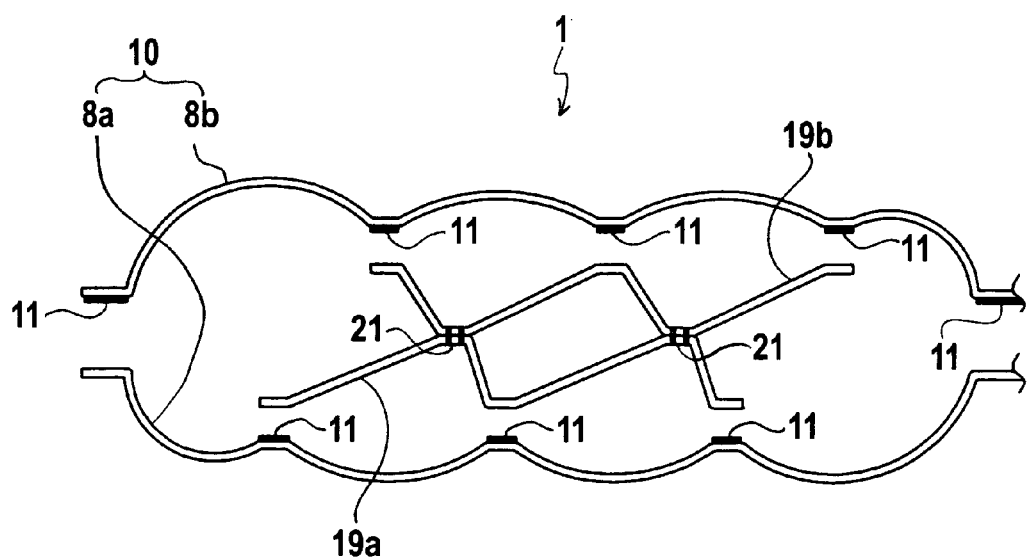
FIG. 5 is an exploded sectional view of FIG. 4, showing the structure of the air bag of FIG. 2.
Figure 6:
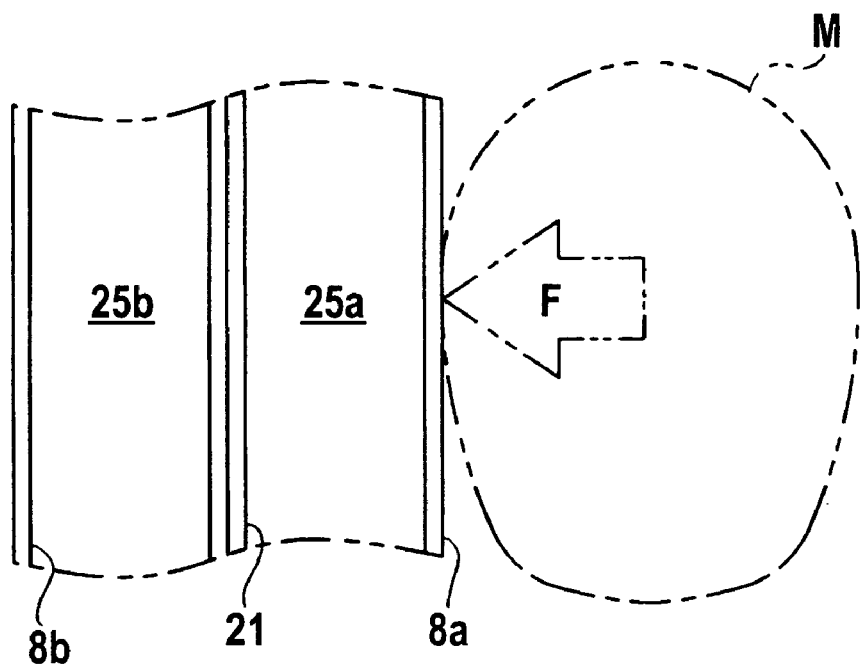
FIG. 6 is a sectional view taken along a line VI-VI of FIG. 4.

Inside the air bag 1 in the expanded state, as shown in FIG. 4, there are defined tubular expansion chambers 23, 24 both in front and in the rear, one by one, due to the provision of two sheets of inner-cloths 19a, 19b. Additionally, in an area where the inner-cloths 19a, 19b exist, there are defined two tubular expansion chambers 25a, 25a on the side of the inside foundation cloth 8a, two tubular expansion chambers 25b, 25b on the side of the outside foundation cloth 8b and a single tubular expansion chamber 26 between the inside inner-cloth (intermediate portion) 19a and the outside inner-cloth (intermediate portion) 19b, thereby providing a three-ply structure.

Figure 7:
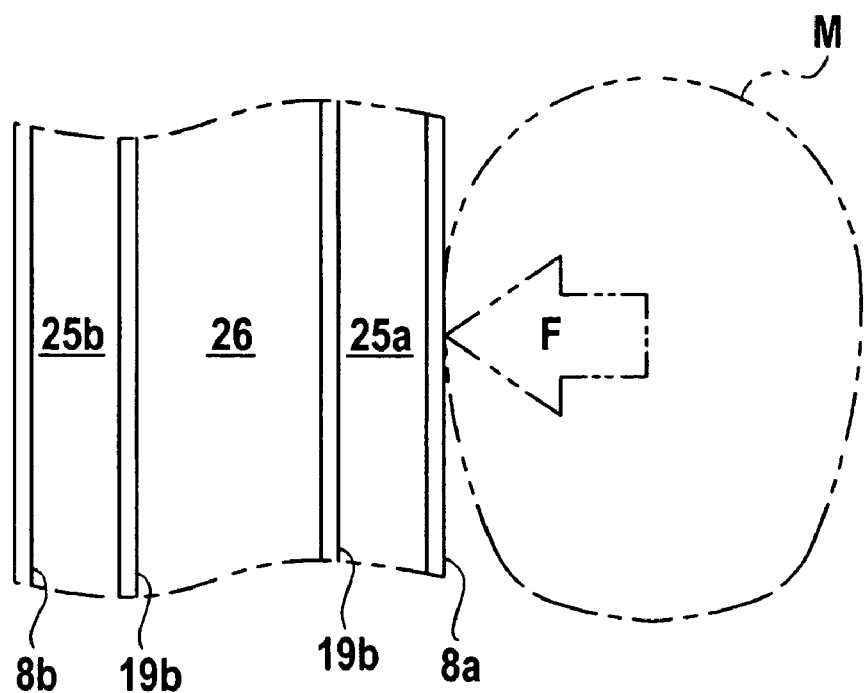
FIG. 7 is a sectional view taken along a line VII-VII of FIG. 4.
Figure 8:
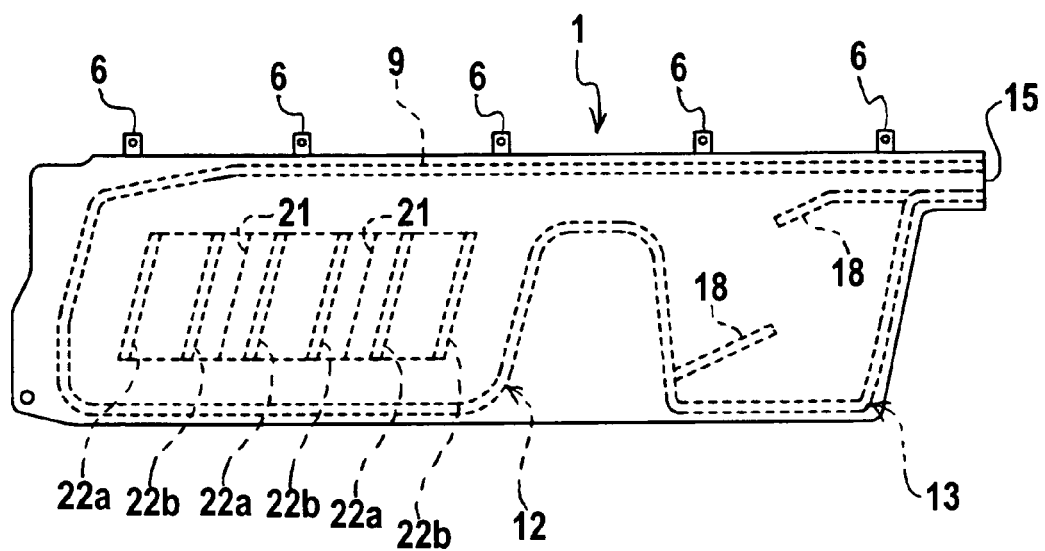
FIG. 8 is a side view of the air bag shown in FIG. 2.

As mentioned above, each of the tubular expansion chambers 25a on the side of the inside foundation cloth 8a is deviated from each of the tubular expansion chambers 25b on the side of the outside foundation cloth 8b in the fore-and-aft direction. Accordingly, in the area where the inner-cloths 19a, 19b exist and in sections in the width direction of the air bag 1, two or more tubular expansion chambers 25a, 25b, 26 are sure to appear while being piled on each other. For instance, two tubular expansion chambers 25a, 25 remain in existence in a section shown in FIG. 6. While, in a section shown in FIG. 7, there exist three tubular expansion chambers 25a, 26, 25b. Therefore, owing to the interposition of a plurality of expansion chambers between a passenger and an object, as shown in FIGS. 7 and 8, it is possible to absorb an energy F due to a side impact to be applied on a head of a passenger M seated on the front seat.

Although the adjoining overlapping junctions 22a, 22b are apart from each other by the predetermined interval D in the fore-and-aft direction so as not to overlap up and down in the above-mentioned embodiment, the arrangement of the overlapping junctions 22a, 22b may be modified to zero the interval D so long as they do not overlap up and down.

According to the present invention, within the compass of the interior foundation cloths, triple-layer tubular expansion chambers are defined in the airbag body by the outside and inside foundation cloths and the interior foundation cloths between the outside and inside foundation cloths. Further, as the tubular expansion chambers on the side of the outside foundation cloth and those on the side of the inside foundation cloth are shifted from each other in the fore-and-aft direction of the vehicle, two or more tubular expansion chambers can be assured in a section in the width direction of the air bag, allowing a passenger's head to be received certainly.

Although the invention has been described above by reference to certain embodiments of the invention where the inner-cloths 19a and 19b consist of plurality of panels, the invention is not limited to the embodiments described above. Modifications and variations of the embodiments descried above will occur to those skilled in the art, in light of the above teachings. For example, according to slanted overlapping junctions 22a or 22b, even only one inner-cloth 19a or 19b is joined to at least one of the outside and inside foundation cloths 8a or 8b, the overlapping junctions 22a,22a or 22b,22b do not overlap each other when rolling up the air bag 1. Therefore, in the air bag 1 in the folded state, its width can be reduced thereby facilitating an accommodation of the air bag 1 into the upper part of the vehicle body.

The entire contents of Japanese Patent Application No. P2006-017951 (filed on Jan. 26, 2006) are incorporated herein by reference.

While preferred embodiments of the present invention have been described using specific terms, such description is for illustrative purposes, and it is to be understood that changes and variations may be made without departing from the spirit or scope of the following claims.

What is claimed is:

1. An air bag to be folded in a vertical direction of a vehicle and accommodated in an upper part of a vehicle body so as to unfold from the upper part downwardly when developed by impact, the air bag comprising, in its unfolded condition:

an airbag body including an outside foundation cloth close to an exterior of the vehicle and an inside foundation cloth close to an interior of the vehicle, the outside and inside foundation cloths having respective peripheries joined to each other through a peripheral junction thereby forming a pouched body; and a pair of interior foundation cloths arranged in the airbag body and consisting of an outside inner-cloth positioned close to the outside foundation cloth and an inside inner-cloth positioned close to the inside foundation cloth, the outside inner-cloth being intermittently joined to the inside inner-cloth through at least two inner junctions separated from each other in a fore-and-aft direction of the vehicle to extend up and down with respect to the fore-and-aft direction of the vehicle, wherein the outside inner-cloth has a front end thereof, a rear end and an intermediate portion between the inner junctions, all of the front end, the rear end and the intermediate portion are joined to the outside foundation cloth through overlapping junctions extending up and down with respect to the fore-and-aft direction of the vehicle;

the inside inner-cloth has a front end thereof, a rear end and an intermediate portion between the inner junctions, all of the front end, the rear end and the intermediate portion are joined to the inside foundation cloth through overlapping junctions extending up and down with respect to the fore-and-aft direction of the vehicle; and the overlapping junctions of the outside inner-cloth are shifted from the overlapping junctions of the inside inner-cloth on either forward or rearward in the fore-and-aft direction of the vehicle, thereby a plurality of tubular expansion chambers are defined in the airbag body to extend up and down with respect to the fore-and-aft direction of the vehicle.

2. The air bag according to claim 1, wherein
the overlapping junctions of the outside inner-cloth and the overlapping junctions of the inside inner-cloth are arranged so as to extend up and down slantwise to the vertical direction.

3. The air bag according to claim 2, wherein
the inner junctions are arranged so as to extend up and down slantwise to the vertical direction.

4. The air bag according to claim 3, wherein
each of the inner junctions is provided by sewing a part of the outside inner-cloth with a part of the inside inner cloth.

5. The air bag according to claim 1, wherein
the overlapping junctions of the outside inner-cloth and the overlapping junctions of the inside inner-cloth are separated from each other at a predetermined distance in the fore-and-aft direction of the vehicle so as not to overlap each other through the uppermost end thereof.

6. The air bag according to claim 1, wherein
the overlapping junctions of the outside inner-cloth and the overlapping junctions of the inside inner-cloth are separated from each other at a predetermined distance in the fore-and-aft direction of the vehicle so as not to overlap each other through the uppermost and lowermost ends thereof.

7. The air bag according to claim 1, further comprising:
an inflator connected to the airbag body to supply with gas at the vehicle impact, wherein
the airbag body includes a front expansion part for a passenger seated on a front seat of the vehicle, a rear expansion part for another passenger seated on a rear seat of the vehicle and an intermediate communication path arranged between the front expansion part and the rear expansion part to communicate the front expansion part with the rear expansion part; and
the interior foundation cloths are arranged in the front expansion part, while the inflator is connected to a rear end of the rear expansion part.

* * * * *